United States Patent [19]

Appelbaum et al.

[11] Patent Number: 4,683,968
[45] Date of Patent: Aug. 4, 1987

[54] SYSTEM FOR PREVENTING SOFTWARE PIRACY EMPLOYING MULTI-ENCRYPTED KEYS AND SINGLE DECRYPTION CIRCUIT MODULES

[75] Inventors: Matthew A. Appelbaum, Boulder; David B. Lehman, Westminster; Donald J. Nieglos, Boulder; Stanley C. Nolte, Lafayette; Michael P. Oehler, Boulder, all of Colo.

[73] Assignee: Burroughs Corporation, Detroit, Mich.

[21] Appl. No.: 771,901

[22] Filed: Sep. 3, 1985

[51] Int. Cl.$^4$ ............................................. H04L 9/00
[52] U.S. Cl. .................................. 380/4; 340/825.34; 380/25; 380/28; 380/45
[58] Field of Search .............. 178/22.08, 22.09, 22.10; 340/825.34; 235/380, 381, 382, 379

[56] References Cited

U.S. PATENT DOCUMENTS

| | | | |
|---|---|---|---|
| 4,123,747 | 10/1978 | Lancto et al. | 178/22.08 |
| 4,186,871 | 2/1980 | Anderson et al. | 178/22.08 |
| 4,193,131 | 3/1980 | Lennon et al. | 178/22.09 |
| 4,386,266 | 5/1983 | Chesarek | 235/380 |
| 4,453,074 | 6/1984 | Weinstein | 235/380 |
| 4,529,870 | 7/1985 | Chaum | 235/380 |

Primary Examiner—Salvatore Cangialoso
Assistant Examiner—Aaron J. Lewis
Attorney, Agent, or Firm—Charles J. Fassbender; Kevin R. Peterson

[57] ABSTRACT

A system which enables a protected program to run only a selected plurality of computers includes a respective unique key Ki for each computer of the plurality, the key being triple encrypted in the form $E_{FK}[E_{Ki}[E_{FK}[Ki]]]$. A respective module is coupled to each computer of the plurality. A checker program in each computer responds to a request to use the protected program by performing a single decryption procedure $E_{FK}^{-1}$ on the triple encrypted key and sends the result to the module as a message. The module performs a single decryption procedure $E_{Ki}^{-1}$ on the message and sends that result back to the computer. The checker program receives the module's result and performs another single decryption procedure $E_{FK}^{-1}$ on it to obtain key Ki. Then the checker program uses key Ki to decrypt an identifier, and proceeds with the execution of the protected program only if it is identified by the decrypted identifier.

10 Claims, 3 Drawing Figures

[SEE BOARD FIG. 2A.]

SYSTEM FOR PREVENTING SOFTWARE PIRACY EMPLOYING MULTI-ENCRYPTED KEYS AND SINGLE DECRYPTION CIRCUIT MODULES

BACKGROUND OF THE INVENTION

This invention relates to data processing systems; and in particular it relates to data processing systems which include some means for preventing the piracy of software programs.

Basically, every data processing system includes a digital computer which performs various tasks in response to a sequence of instructions called a program or software. Many different programs can be writtem for the same computer; and in each program, the sequence of instructions is differently arranged in accordance with the particular task that the computer is to perform. For example, one program can direct the computer to perform inventory operations, another program can direct the computer to perform payroll operations, etc.

Often, the programs which are written for a computer are very complex, comprise thousands of instructions, and represent a considerable investment in time and money. Therefore, efforts have been made in the prior art to prevent software from being stolen by software pirates. However, software is very easy to copy since it usually is stored on a magnetic tape or magnetic disk which is readily duplicated. Consequently, protecting software from piracy is difficult to achieve.

This problem of protecting software is most difficult for corporations which produce and license software programs, as a product, to many different customers. Each time a program is distributed under a license to a different customer, that customer becomes a potential software pirate. For example, the potential exists for a customer to copy the licensed software, terminate his license, and thereafter run the software copy. Also, the potential exists for the customer to copy the software and distribute it to third parties.

One of the prior art means which has been devised to prevent software piracy is described in U.S. Pat. Nos. 4,168,396 and 4,278,837 to Best. In these patents, each instruction of the program is encrypted and sent to the customer in the encrypted form. Then, when the program is to be run, it is read into the computer in encrypted form, decrypted inside of the computer, and executed.

In the Best system, the decrypted program is not available for copying since the program on the storage media is always encrypted. However, since each instruction must be decrypted prior to being executed, execution of the program is very slow. Further, the program only runs on specially constructed computers which do the decryption. These computers are only supplied by the software vendor; so the Best system does not even work in the typical case where the software customer wants to run a licensed program on a computer which he already owns.

Another prior art software protection system is described in U.S. Pat. 4,471,163 by Donald et al. In that system, the customer of a licensed program is supplied a program lock unit which performs a predetermined calculation on a number; and the program itself is modified to also perform the same calculation on the same number. Then the program compares the result of its calculations to the result obtained from the lock unit and the program stops if the two results are not equal.

A problem, however, with the Donald et al system is that the result of the calculation which the lock unit performs is passed to the computer over a conductor on which it could be read by a line analyzer. After being read, that same result could be generated by any memory circuit, such as a programmed read only memory. Thus a copy of the protected program could be made to run by simply replacing the lock unit with the read only memory.

Also in the Donald et al system, no further checks are made after the two results have been compared and the program has started to run. Therefore, one copy of the program can be started on a system to which the lock unit is attached, and thereafter the lock unit can be removed and transferred to another system whereupon another copy of the program can be started. Thus the protection system is not suitable for programs of a type which operate for long time periods—such as graphics programs which operate all day in an interactive fashion with an operator.

Another problem with the Donald et al system is that the customer of a licensed program must be given a copy of a key that contains several paramemters which the customer then enters via a keyboard into the lock unit. Those parameters are operated on by the lock unit to produce the result which the licensed program compares. However, having this key enables a customer of one program (program A) to copy his key and his program, and then give those copies to a customer of another program (program B). In return, the customer of program B can copy his program and his key, and given them to the customer of program A.

In view, therefore, of all of these prior art problems with protecting software, it is a primary object of the invention to provide an improved system for preventing software piracy in which these and other prior art deficiencies are overcome.

BRIEF SUMMARY OF THE INVENTION

In accordance with the present invention, the above object, and others, are achieved by a system which enables a protected program to run on only a selected plurality of computers, and which comprises:

a respective unique key for each computer of the plurality; the key being triple encrypted in the form $E_{FK}[E_{Ki}[E_{FK}[Ki]]]$ where Ki is the unencrypted key, $E_{Ki}$ is an encryption procedure E which uses key Ki, and $E_{FK}$ is the same encryption procedure E using a single fixed key FK for all of the computers;

a respective module coupled to each computer of the plurality;

a checker program in each computer which responds to a request to use the protected program by performing a single decryption procedure $E_{FK}^{-1}$ on the triple encrypted key and sends the result to the module as a message M;

a means in the module which performs a single decryption procedure $E_{Ki}^{-1}$ on message M and sends $E_{Ki}^{-1}[M]$ back to the computer;

a means in the checker program for receiving $E_{Ki}^{-1}[M]$ from the module and for performing another single decryption procedure $E_{FK}^{-1}$ on it to obtain key Ki;

an identifier for the protected program that is encrypted with key Ki; and a means in the checker program for using key Ki to decrypt the identifier, and for proceeding with the execution of the protected program only if it is identified by the decrypted identifier.

BRIEF DESCRIPTION OF THE DRAWINGS

Various features and advantages of the invention are described in detail in the following Detailed Description in conjunction with the accompanying drawings wherein.

DETAILED DESCRIPTION OF THE INVENTION

Figure 1:
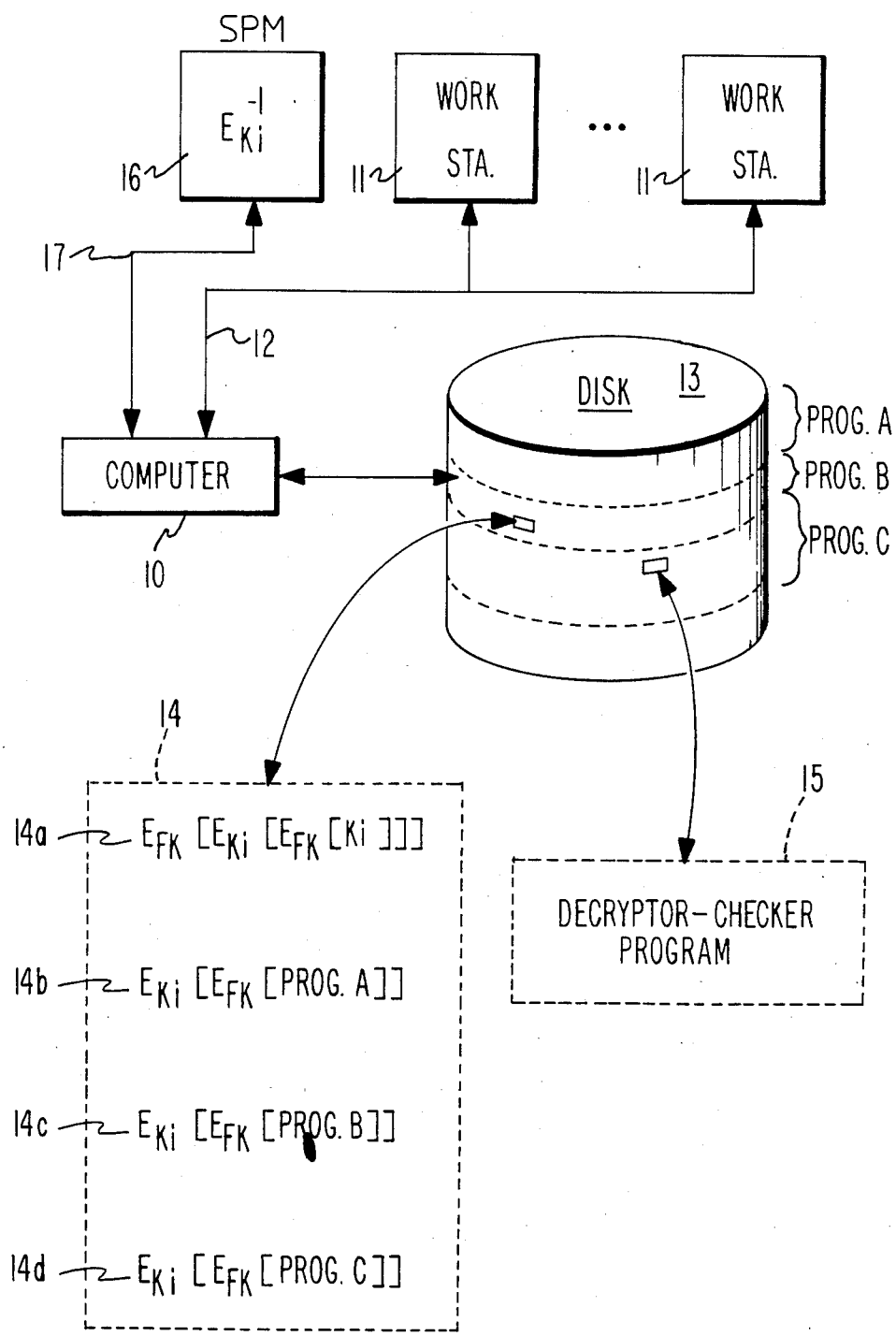
FIG. 1 illustrates a system for preventing software piracy in accordance with the invention.

Referring now to FIG. 1, a preferred embodiment of a system which prevents software piracy in accordance with the invention will be described in detail. This system includes a digital computer 10, a plurality of work stations 11, and an input/output bus 12 which couples the work stations 12 to computer 10. Computer 10 may be any type of general purpose digital computer, such as a GRAFTEK Comet. Similarly, each work station 11 may be any type of terminal which has a keyboard that enables an operator to request computer 10 to execute various programs, such as a GRAFTEK Meteor.

Also included in the FIG. 1 system is a disk 13 which stores protected software programs that run on computer 10. These programs are indicated as PROG A, PROG B, and PROG C. Each program may direct computer 10 to perform any type of desired functions, and its exact makeup is unimportant. For example, the programs could interact with an operator at the workstation to rotate a graphics image on a CRT screen in the workstation, display two graphics images in a split screen fashion on the CRT screen, or zoom in on a particular feature of the image that is being displayed.

Disk 13 also stores an encrypted list 14. Entry 14a of this list is a triple encrypted key of the form $E_{FK}[E_{Ki}[E_{FK}[Ki]]]$. In this expression, Ki is an unencrypted key that is unique to computer 10. That is, each time the FIG. 1 system is duplicated for a different customer, key Ki) is changed.

Term $E_{Ki}$ in the above expression represents an encryption procedure E which uses key Ki. Thus, when the FIG. 1 system is duplicated for different customers, the encryption procedure E in each system is the same, but the key Ki in each system is different.

Similarly, term $E_{FK}$ in the above expression represents the encryption procedure E as recited above but which is performed with a single fixed key FK. Thus, when the FIG. 1 system is duplicated for different customers, the encryption procedure E and its key FK is the same in each system.

All of the protected programs on the FIG. 1 system also have a corresponding encrypted identifier in list 14. Entry 14b is the encrypted identifier for PROG A; entry 14c is the encrypted identifier for PROG G; and entry 14d is the encrypted identifier for PROG C. Each of these identifiers is encrypted first with procedure $E_{FK}$ and thereafter with procedure $E_{Ki}$.

Disk 13 also stores a decryptor-checker program 15. All of the details of this program will be described shortly in conjunction with FIG. 2. In general, however, program 15 operates in response to a request from an operator at work station 11 for computer 10 to run a particular program. During its operation, program 15 checks whether the requested program is included in the encrypted list 14. If the requested program is in list 14, then execution of that program is permitted to occur; otherwise, it is not.

A software protection module (SPM) 16 which operates in conjunction with program 15 is also included in the FIG. 1 system. Module 16 is coupled to computer 10 via a serial I/O bus 17. In operation, module 16 receives a message via bus 17 from computer 10, performs a decryption function $E_{Ki}^{-1}$ on that message, and sends the results back via bus 17 to computer 10.

If the FIG. 1 system is duplicated for different customers, the decryption steps $E^{-1}$ which module 16 performs is the same in each system. However, the key Ki which module 16 uses in those steps is different in each system.

Preferably, module 16 is packaged such that it is very difficult, if not impossible, to open the package without destroying the key Ki. This may be achieved by integrating the key inside of a microprocessor chip which is programmed to perform the $E_{Ki}^{-1}$ function, and by putting the microprocessor chip in a very hard and chemically resistant substance, such as a polyimide, Teflon, or ladder-organosiloxane polymers.

Figure 2:
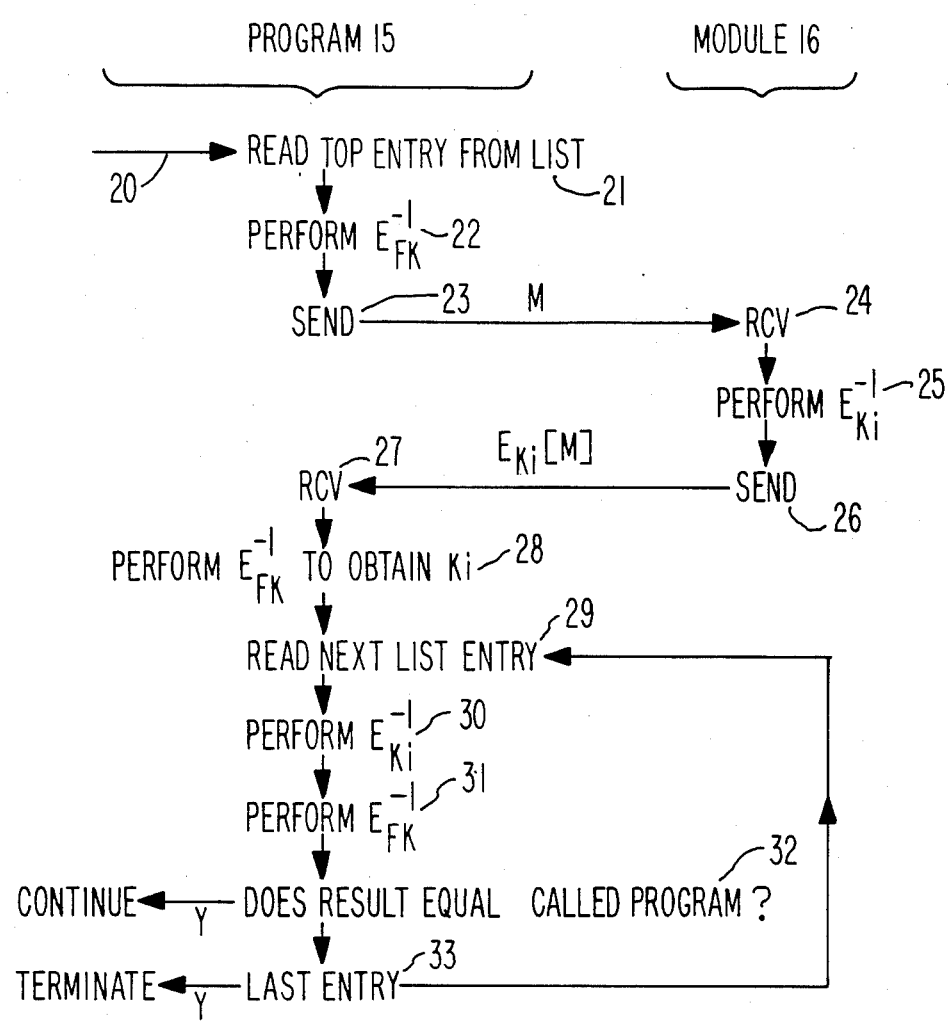
FIG. 2 illustrates additional details of a decryptor-checker program in the FIG. 1 system.
Figure 2A:
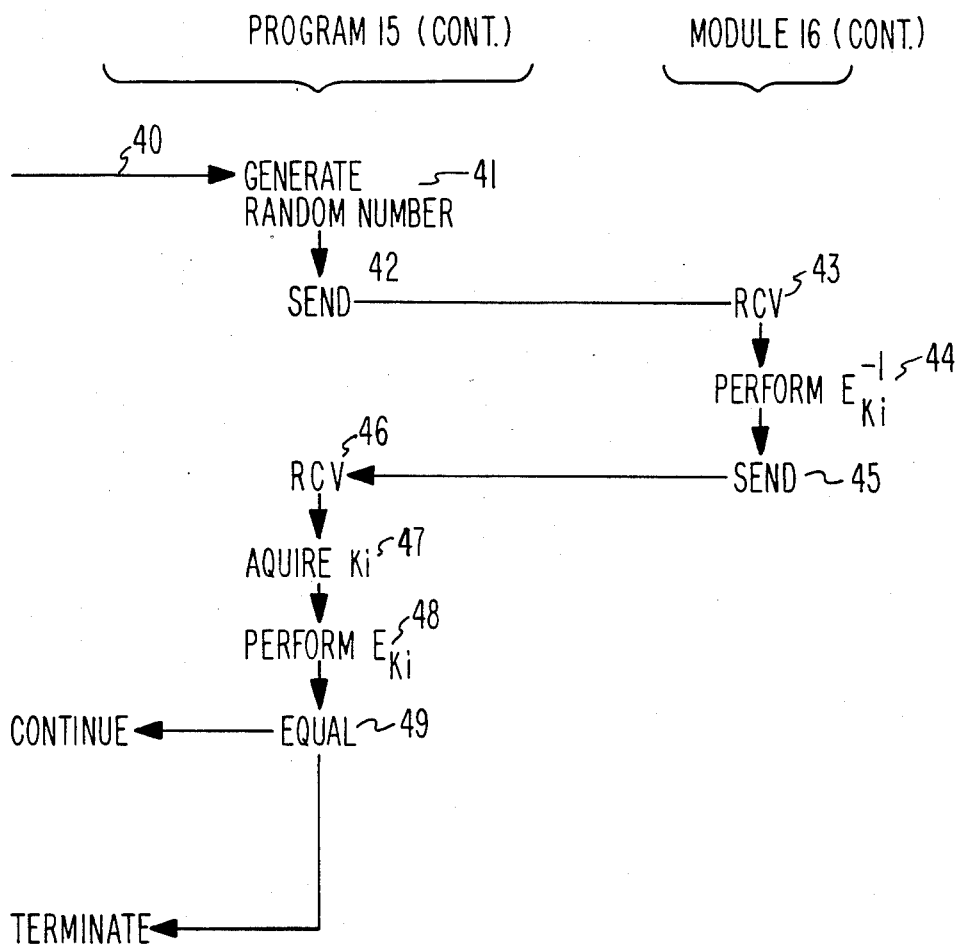
FIG. 2A is an extension of FIG. 2 and illustrates further details of the decryptor-checker program in the FIG. 1 system.

Referring next to FIG. 2, the decryptor-checker program 15 will be described in detail. This program is entered at a point 20 in response to a request from an operator at work station 11 for computer 10 to run PROG A, PROG B, or PROG C. Program 15 begins by reading the triple encrypted key 14a from list 14. Then it performs the single decryption function $E_{FK}^{-1}$ on entry 14a and sends the result to module 16 as a message M. This is indicated by reference numerals 21, 22, and 23.

Module 16 responds by receiving the message M which computer 10 sent and performing a single decryption function $E_{Ki}^{-1}$ on that information. Then module 16 sends the result back to computer 10 as $E_{Ki}^{-1}[M]$. This is indicated in FIG. 2 by reference numerals 24, 25, and 26.

Program 15 receives the information which module 16 sent and performs the single decryption function $E_{FK}^{-1}$ on it to obtain the unencryted key Ki. This is indicated by reference numerals 27 and 28.

Thereafter, program 15 reads the remaining entries in list 14 and performs the decryption functions $E_{Ki}^{-1}$ and $E_{FK}^{-1}$ on them. If the result of those decryption operations yields the name of the program which was requested by work station 11, then execution of that program continues. Otherwise, execution of the requested program is bypassed. This is indicated by reference numerals 29 thru 33.

One important feature of the above described system is that the list 14 and module 16 are matched such that they only work together as a pair. Thus a potential software pirate cannot make and sell copies of the protected programs because each program will only run on a system which has a particular module 16.

Another important feature of the above described system is that none of the messages on bus 17 between computer 10 and module 16 contain key Ki in its unencrypted form. Therefore, a potential software pirate cannot detect the key Ki by placing a line analyzer on bus 17 to read the messages on the bus.

Yet another feature of the above system is that none of the messages that are transmitted on bus 17 correspond to any entry in the encrypted list 14. Therefore, a potential software pirate cannot even determine what parts of list 14 are being transmitted on bus 17 by placing a line analyzer on bus 17 to record the messages and by later comparing those messages to the data which is stored on the disk.

Still another feature of the above described system is that key Ki permanently exists in its unencrypted form only in module 16. But module 16 is tamperproof in the sense that key Ki is destroyed if the module is opened. Therefore, there is no permanent copy of key Ki for a potential software pirate to obtain.

Another feature of the above system is that it provides a very practical means for a software vendor to protect his programs. This is because most computers have a serial I/O bus, and so that software vendor doesn't need to design a module with a new bus interface for each customer. Instead for each customer, only list 14 needs to be encrypted differently and a different key Ki needs to be potted in module 16.

Program 15 also has a second entry point as indicated by reference numeral 40. This point of the program is entered at randomly selected time instants while any of the authorized programs are running.

Upon entering point 40, program 15 generates a random number and sends it to module 16. In response, a module 16 receives the random number, performs the decryption function $E_{Ki}^{-1}$ on the random number, and sends the result back to computer 10. This is indicated by reference numerals 41 thru 45.

After receiving the decrypted random number, program 15 acquires key Ki and performs the encryption function $E_{Ki}$ on the decrypted random number. This result is then compared to the originally generated random number of step 41. If the numbers are equal, the running of the requested program is continued. Otherwise, the running of the requested program is terminated. This is indicated by reference numerals 46-49.

One feature of this portion of program 15 is that it prevents a thief from removing module 16 after a protected program has started running. Therefore, a thief cannot start the protected programs on the FIG. 1 system, move module 16 to another system which has a copy of the protected programs, and start the copied programs running without having FIG. 1 system stop.

Yet another feature of the above portion of program 15 is that it prevents a thief from duplicating module 16 by placing a line analyzer on bus 17, monitoring and storing all of the responses which module 16 makes, and building a circuit which duplicates those responses. Such an attempt will not work since the numbers sent via step 42 and the response received via step 46 will always be changing with time.

A preferred embodiment of the invention has now been described in detail. In addition, however, many changes and modifications can be made to these details without departing from the nature and spirit of the invention.

For example, the details of the encryption steps E and decryption steps $E^{-1}$ as well as their specific implementation is unimportant. Any encryption-decryption algorithm will work so long as it meets the constraint $E^{-1}_{Ki}[E_{Ki}[Ki]] = Ki$. Many suitable algorithms and implementations are described, for example, in the text *Cryptography: A New Dimension in Computer Data Security* by Meyer et al, published by John Wiley & Sons.

As another modification, entry 14a in list 14 may be replaced with a double encrypted key of the form $E_{Ki}$-

$[E_{FK}[Ki]]$. This would eliminate the need for step 22 in program 14, which would make the program run faster. However, the price for this increase in speed will be a decreased degree of security.

As still another modification, checker program 15 can be partitioned into may parts which are scrambled throughout the protected programs (e.g., program A, program B, and program C). Usually the protected programs are much larger than the checker program, so locating the checker program after such scrambling is essentially impossible. Thus, this gives an added degree of security since it prevents a potential software pirate from locating the checker program and bypassing it.

Accordingly, since many such modifications are possible, it is to be understood that the invention is not limited to the above details but is defined by the appended claims.

What is claimed is;

1. A system for enabling a protected program to run on only a selected plurality of computers, comprising:
    a respective triple encrypted key for each of said computers of the form $E_{FK}[E_{Ki}[E_{FK}[Ki]]]$ where Ki is an unencryped key that is unique to each of said computers, $E_{Ki}$ is an encryption procedure E which uses key Ki, and $E_{FK}$ is the same encryption procedure E using a single fixed key FK for all of said computers;
    a respective unique module coupled to each computer of said plurality for performing a decryption procedure $E_{Ki}^{-1}$ where Ki is unique to each module;
    a checker program in each computer which responds to requests to use said protected program by performing a single decryption procedure $E_{FK}^{-1}$ on said triple encrypted key and sends the result to said module as a message M;
    said module being adapted to perform said single decryption procedure $E_{Ki}^{-1}$ on said message M and send $E_{Ki}^{-1}[M]$ back to said computer;
    a means in said checker program for receiving $E_{FK}^{-1}[M]$ from said module and for performing another single decryption procedure $E_{FK}^{-1}$ on it to obtain key Ki;
    an identifier that is encrypted with said key Ki; and
    a means in said checker program for using key Ki to decrypt said identifier, and for proceeding with the execution of said protected program only if it is identified by the decrypted identifier.

2. A system according to claim 1 wherein said checker program further includes a means for intermittently stopping the protected program's execution to send a random number to said module, to receive a response from said module, and to continue with the execution of said protected program only if the encryption $E_{Ki}$ of said response matches said random number.

3. A system according to claim 2 wherein said identifier is double encrypted via procedures $E_{FK}$ and $E_{Ki}$.

4. A system according to claim 3 wherein said module is coupled to its computer via a bit serial bus.

5. A data processing system comprised of:
    a computer having a key Ki that is unique to said computer and is at least double encrypted in the form $E_{Ki}[E_{FK}[Ki]]$ where $E_{Ki}$ is an encryption procedure E which uses key Ki, and $E_{FK}$ is the same encryption procedure E using another key FK;
    a module coupled to said computer for receiving said key in said double encrypted form in response to a request for said computer to run a protected program and for partially decrypting said double encrypted key to a single encrypted key $E_{FK}[K_i]$;

a checker program for receiving said single encrypted key $E_{FK}[K_i]$ from said module and for completing its decryption to $K_i$;

an identifier that is encrypted with said key $K_i$; and a means in said checker program for using $K_i$ to decrypt said identifier, and for proceeding to run said protected program only if it is identified by the decrypted identifier.

6. A system according to claim 5 wherein said checker program further includes a means for temporarily stopping the protected program's execution to send a random number to said module, to receive a response from said module, and to continue with the execution of said protected program only if the encryption $E_{Ki}$ of said response matches said random number.

7. A system according to claim 5 wherein said key $K_i$ is stored in a storage media in a triple encrypted form $E_{FK}[E_{Ki}[E_{FK}[K_i]]]$, and said checker program includes a means for performing $E_{FK}^{-1}$ on the permanently stored key and sending the double encrypted result to said module.

8. A system according to claim 5 wherein said identifier is double encrypted via procedures $E_{FK}$ and $E_{Ki}$.

9. A system according to claim 5 wherein said module is coupled to said computer via a bit serial bus.

10. A data processing system of the type which includes a computer, a protected program for said computer, and a module coupled to said computer; said system further including:

a key $K_i$ that is unique to said computer and is double encrypted;

a means in said computer for receiving a request to use said protected program, and in response thereto, for sending said double encryted key to said module;

a means in said module for performing a decryption procedure $E_{Ki}^{-1}$ on said double encrypted key to obtain a single encrypted key and for sending the latter back to said computer;

a means in said computer for decrypting said single encrypted key to an unencrypted key; and a means in said computer for utilizing said unencrypted key to decrypt an encrypted identifier, and for proceeding with the execution of said protected program only if the decrypted identifier has a predetermined value.

* * * * *